US012571880B2

(12) United States Patent
Addison et al.

(10) Patent No.: US 12,571,880 B2
(45) Date of Patent: Mar. 10, 2026

(54) HARDWARE BOUNDARY CHECKING FOR RADAR

(71) Applicant: Infineon Technologies AG, Neubiberg (DE)

(72) Inventors: David Addison, Bristol (GB); Dyson Wilkes, Marlborough (GB); Markus Bichl, Feldkirchen-Westerham (DE); Sandeep Vangipuram, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 342 days.

(21) Appl. No.: 18/183,292

(22) Filed: Mar. 14, 2023

(65) Prior Publication Data

US 2024/0310480 A1     Sep. 19, 2024

(51) Int. Cl.
 *G01S 7/35* (2006.01)
 *G01S 13/58* (2006.01)

(52) U.S. Cl.
 CPC .............. *G01S 7/354* (2013.01); *G01S 7/356* (2021.05); *G01S 13/584* (2013.01)

(58) Field of Classification Search
 CPC .......... G01S 7/356; G01S 7/032; G01S 7/354; G01S 13/584; G01S 13/931
 USPC .................................................. 342/196, 70
 See application file for complete search history.

(56) References Cited

U.S. PATENT DOCUMENTS

| | | | | | |
|---|---|---|---|---|---|
| 4,132,989 | A | * | 1/1979 | Frosch ................ | G01S 13/9011 708/424 |
| 4,721,958 | A | * | 1/1988 | Jenkin ..................... | G01S 7/021 342/13 |
| 5,371,581 | A | * | 12/1994 | Wangler ................ | G01S 17/933 340/963 |
| 5,455,846 | A | * | 10/1995 | Gardner .................. | H04L 27/00 375/340 |
| 5,515,857 | A | * | 5/1996 | Tsujino .................. | A61B 8/065 600/456 |
| 6,078,281 | A | * | 6/2000 | Milkovich .............. | G06F 17/14 342/162 |
| 6,255,981 | B1 | * | 7/2001 | Samaniego ........... | G01S 13/904 342/25 R |
| 6,717,870 | B2 | * | 4/2004 | Frankowsky .......... | G11C 29/44 365/201 |
| 11,592,523 | B2 | * | 2/2023 | Schubert ............. | G01S 13/5246 |
| 11,754,698 | B2 | * | 9/2023 | Westra .................... | G01S 7/417 342/25 A |
| 11,815,589 | B2 | * | 11/2023 | Jansen ..................... | H04B 1/18 |
| 12,015,824 | B2 | * | 6/2024 | Fleizach .................. | G01S 1/00 |
| 12,019,141 | B2 | * | 6/2024 | Overdevest ........... | G01S 13/584 |

(Continued)

*Primary Examiner* — Michael W Justice
(74) *Attorney, Agent, or Firm* — Eschweiler & Potashnik, LLC

(57) ABSTRACT

A radar system including a direct memory access (DMA). The DMA includes a bus interface including control/status registers and data-in/data-out registers. The DMA also includes potential object queue memory coupled to the bus interface, and a potential object queue logic coupled to the potential object queue memory. The DMA also includes boundary checking circuitry configured to detect whether any portion of a DMA read configuration is greater than a maximum range bin or less than a minimum range bin. The boundary checking circuitry detects whether any portion of the DMA read configuration is greater than a maximum Doppler bin or less than a minimum Doppler bin.

17 Claims, 5 Drawing Sheets

300

(56)         References Cited

U.S. PATENT DOCUMENTS

| | | | |
|---|---|---|---|
| 2009/0254697 A1* | 10/2009 | Akerib | G11C 7/1006 |
| | | | 711/E12.001 |
| 2016/0266238 A1* | 9/2016 | Brett | G01S 13/42 |
| 2019/0346548 A1* | 11/2019 | Barkan | G01S 13/5242 |
| 2021/0116541 A1* | 4/2021 | Schubert | G01S 7/415 |
| 2021/0261154 A1* | 8/2021 | Wang | G01S 13/60 |
| 2022/0066012 A1* | 3/2022 | Jansen | H04B 1/18 |
| 2022/0187438 A1* | 6/2022 | Overdevest | G01S 13/532 |
| 2022/0252716 A1* | 8/2022 | Westra | G01S 7/354 |
| 2022/0303622 A1* | 9/2022 | Fleizach | H04N 21/6112 |
| 2022/0308160 A1* | 9/2022 | Dent | G01S 7/2813 |
| 2023/0024713 A1* | 1/2023 | Kang | G01S 13/89 |
| 2023/0096861 A1* | 3/2023 | Bichl | G01S 13/584 |
| | | | 342/109 |
| 2023/0196501 A1* | 6/2023 | Finkelstein | G06T 7/55 |
| | | | 382/106 |
| 2024/0311320 A1* | 9/2024 | Addison | G06F 13/28 |
| 2024/0353527 A1* | 10/2024 | Wilkes | G01S 13/584 |

* cited by examiner

300

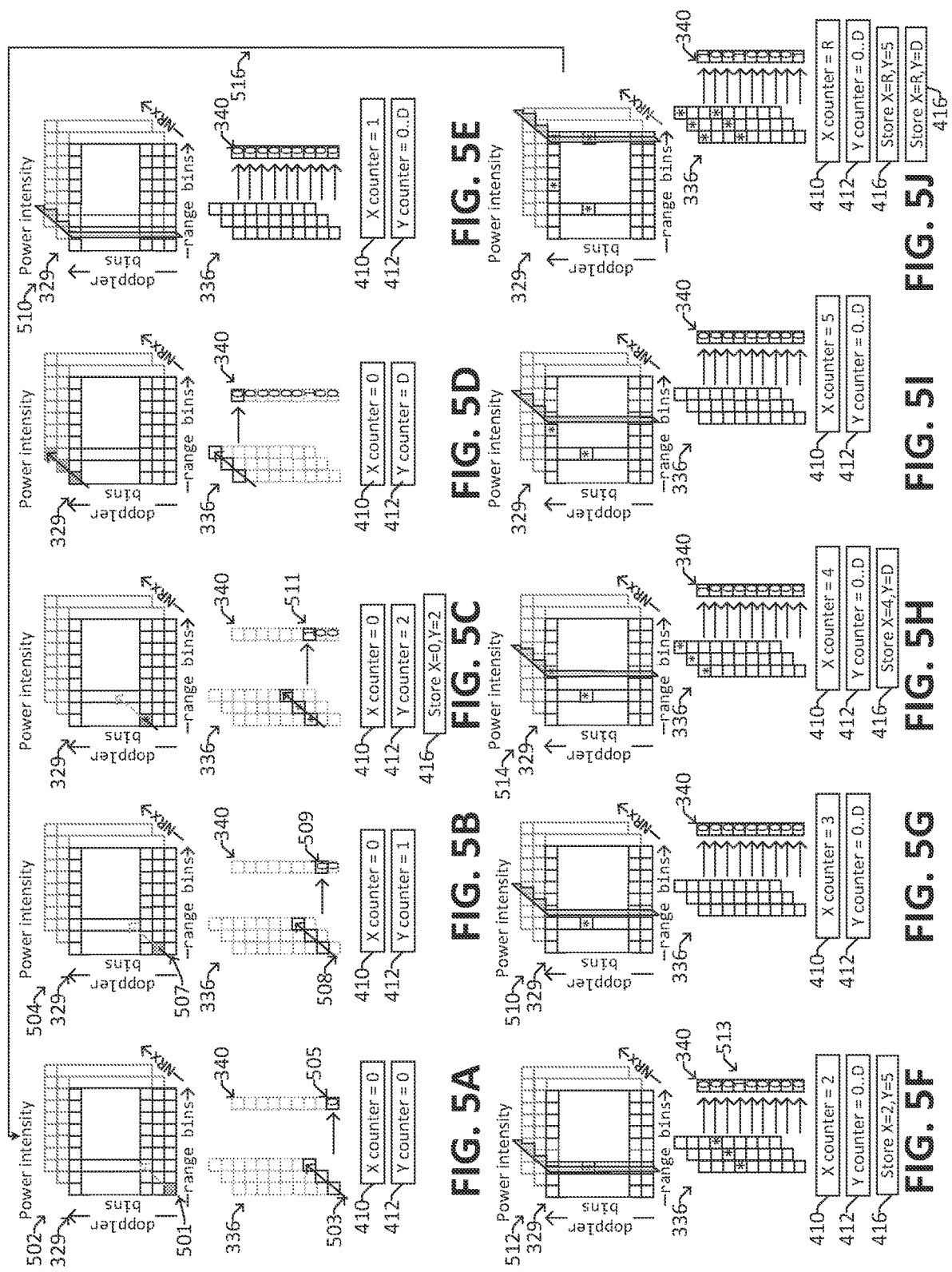

HARDWARE BOUNDARY CHECKING FOR RADAR

FIELD

The present disclosure relates in general to electronic systems such as radar systems, and more particularly, to radar systems that utilize Doppler division multiplexing in frequency modulated continuous wave radar.

BACKGROUND

Radar (RAdio Detection And Ranging) systems use radio waves to determine the location and/or velocity of objects in a field. Historically, radar has been used to detect aircraft, ships, spacecraft, guided missiles, and terrain, among others. In more recent times, radar has also been used to study and/or predict weather formations, and has been used in collision-detection and/or collision-avoidance in motor vehicles. A radar system includes a transmitter to produce electromagnetic waves in the radio or microwave domain, a receiver to receive those waves after they bounce back from one or more objects in a field, and a processor to determine properties of the objects. The electromagnetic waves from the transmitter can be pulsed or continuous, and reflect off the object and return to the receiver, giving information about the object's location and/or velocity relative to the radar system.

BRIEF DESCRIPTION OF THE DRAWINGS

FIGS. 5A-5J illustrate a series parallel processing operations whereby a first stream of complex numbers from a Fast Fourier transform (FFT) circuit is stored in a memory and concurrently processed by a detection circuit to generate a second stream of bits provided to a DMA.

DETAILED DESCRIPTION

Figures 1, 2:
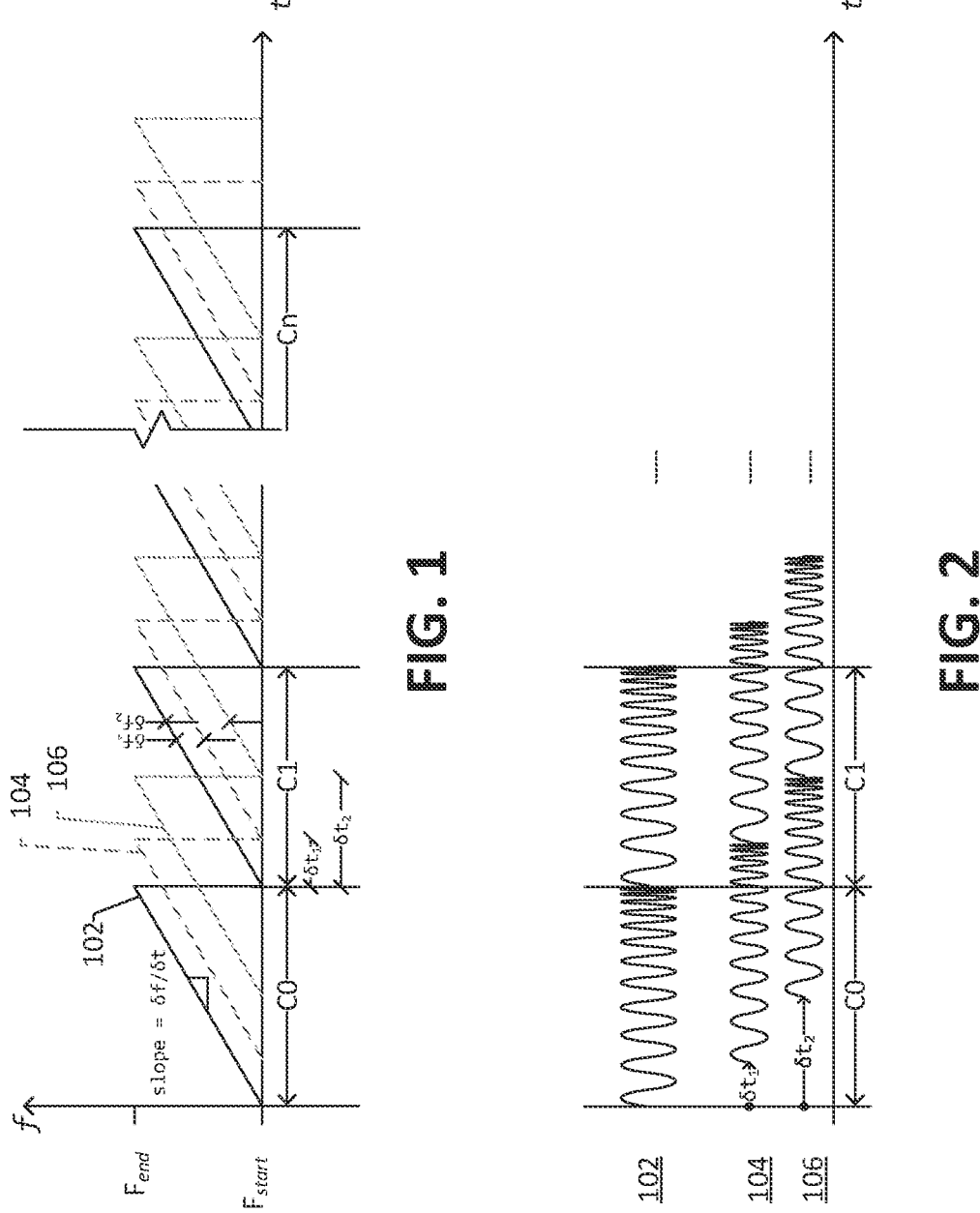
FIG. 1 illustrates a transmitted waveform and received waveforms used in a frequency modulated continuous wave (FMCW) radar system.
FIG. 2 illustrates a transmitted pulse and received pulses used in a FMCW radar system.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

Conventional radar systems include an analog front end implemented in hardware to provide a digital radar signal, and a baseband process running software to analyze that digital radar signal. Some aspects of the present disclosure lie in the appreciation that although such software is flexible, it runs more slowly than optimal, particularly for modern radar systems, such as in automotive radar systems. Therefore, to improve processing speed, baseband processors in accordance with this disclosure include one or more fast Fourier transform (FFT) circuits that store FFT results in a memory. A direct memory access (DMA) circuit and detection circuit then read the FFT results from the memory and process those FFT results to provide object detection that runs faster than software solutions. By reducing software overhead, the DMA and detection circuit streamline processing and improve performance of the radar systems compared to other approaches that utilize software for object detection.

Radar systems transmit electromagnetic waves in the form of discrete pulses or continuous waves, and then listen for received pulses (or echoes) to determine the location and/or velocities of objects in a field. For example, FIG. 1 shows an example of a simple transmitted waveform 102 transmitted by a frequency modulated continuous wave (FMCW) radar system, and two received waveforms (or echoes) 104, 106 that reflect back from various objects in the field. It will be appreciated that these waveforms are merely non-limiting examples, and actual waveforms can take any number of forms.

The transmitted waveform 102 includes a series of ramps or chirps, which are transmitted so as to be repeated at regularly spaced time windows C0, C1, C2, . . . , Cn. FIG. 1 shows the instantaneous frequency of the chirps versus time, while FIG. 2 shows the corresponding modulated voltage signals of the chirps as they are transmitted in the corresponding time windows C0, C1, . . . . Each ramp starts at the beginning of a given time window at a start frequency $F_{start}$ and ramps up or down to an end frequency $F_{end}$ at the end of the given time window. Ideally, each ramp has a constant slope during that time window, which provides a link between time delay, beat frequency, and range for various objects in the FMCW radar system. In actual implementations, the slope may not be perfectly constant and may vary slightly in time.

The received waveforms 104, 106 or "echoes" are in response to the transmitted waveform 102. The received waveforms 104, 106 are time delayed copies of the transmitted waveform 102 and also carry a Doppler component due to the relative velocity of the object from which they reflect. Thus, for example, in FIG. 1 and FIG. 2, the first received waveform 104 is reflected from a first object at range 1 and is delayed relative to the transmitted pulse by a first delay, $\delta t1$ for the first time window C0. Similarly, the second received waveform 106 is reflected from a second object at range 2 and delayed relative to the transmitted waveform 102 by a second delay, $\delta t2$ for the first time window C0. Because these time delays $\delta t1$, $\delta t2$ represent the roundtrip delay from the transceiver to the first and second objects in the field, these time delays form the basis of determining the first and second ranges to the first and second objects, respectively. Further, for later time windows, if the first object is moving, the delay between the transmitted waveform 102 and the first received waveform 104 may change slightly (relative to the first delay, $\delta t1$), and this can evidence the velocity of the first object. Note that, relative to the duration of a given time window, the lengths of the first and second time delays $\delta t1$, $\delta t2$ are exaggerated in FIG. 1 and FIG. 2 for purposes of clarity of understanding.

Figure 3:
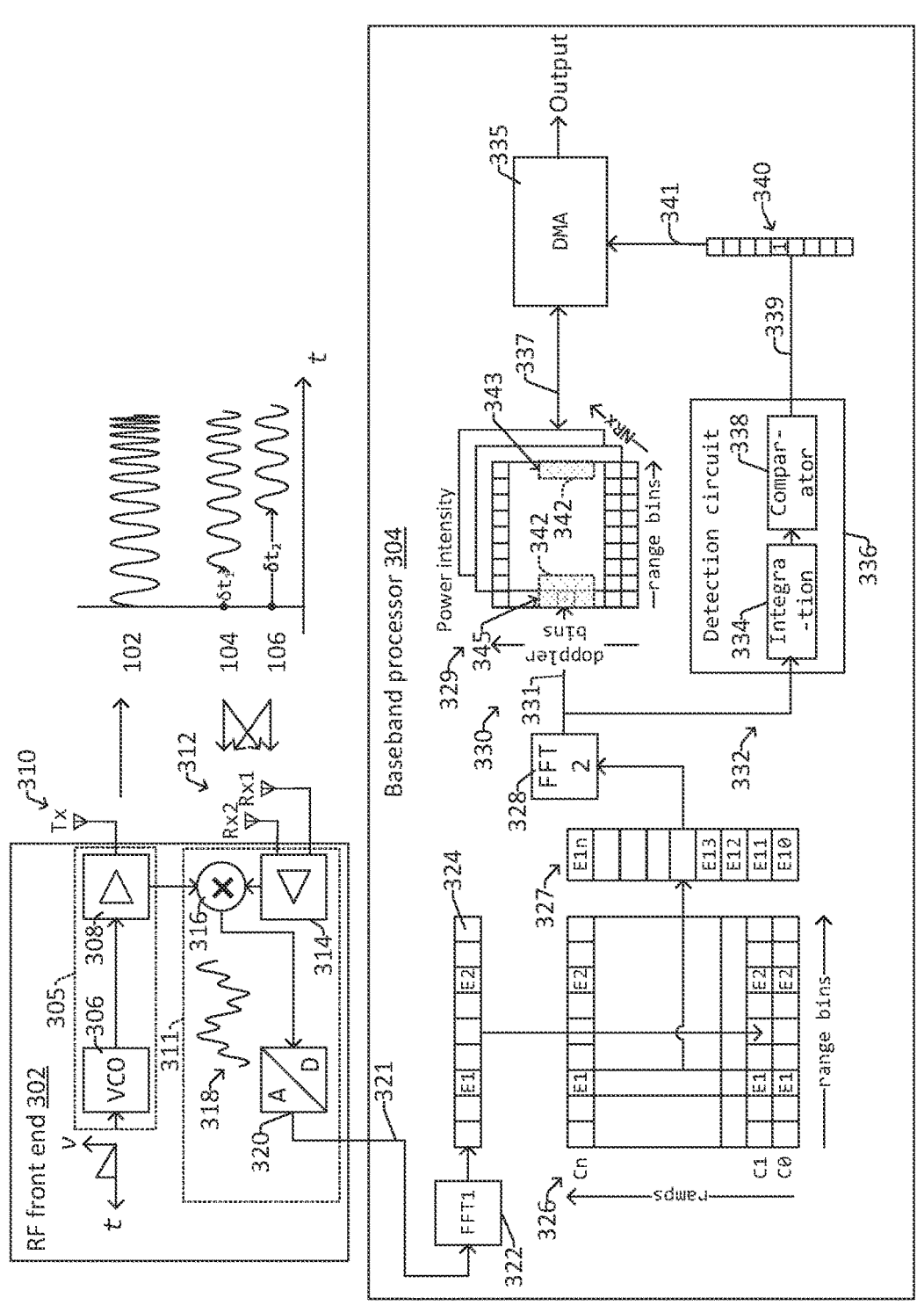
FIG. 3 illustrates a FMCW radar system, including a Direct Memory Access (DMA) hardware module with hardware boundary checking.

FIG. 3 illustrates a FMCW radar transceiver 300 in accordance with some embodiments, and which can make use of FMCW waveforms such as described in FIGS. 1-2. The transceiver 300 includes a radio frequency (RF) front end 302 and a baseband processor 304 downstream of the RF front end 302. The RF front end 302 includes a transmission path 305 and a reception path 311. The transmission path 305 includes a voltage controlled oscillator (VCO) 306, and a transmission amplifier 308, and is coupled to a transmission Tx 310. The reception path 311 is coupled to Nrx reception antennae 312 (Nrx=any positive integer), and includes a reception amplifier 314, a mixer 316, and an analog-to-digital converter (ADC) 320. The reception antennae 312 are typically spaced apart at equal distances from one another.

During operation, the transmission path 305 generates a transmitted waveform 102 using the VCO 306. In the illustrated example, the transmitted waveform 102 has a frequency that ramps in time for n ramps transmitted in n time windows, respectively. The transmitted waveform 102 is achieved by performing a frequency modulation of a carrier frequency, Fc, such that the instantaneous frequency of the transmitted waveform 102 varies from $f_{start}$ to $f_{end}$. The transmitter transmits the waveform 102 using the transmission amplifier 308 and transmission antenna Tx 310.

The received waveforms or "echoes" (e.g., 104 and 106) are received by the reception antennae 312 and the reception amplifier 314. Because each object in the field generates a different echo, each reception antenna 312 sees a superposition of all received waveforms. The mixer 316 mixes the transmitted waveform 102 and the received waveforms 104, 106 and thereby multiplies these waveforms together to provide a mixed signal 318. This mixed signal 318 includes a beat frequency, which is a mixture of the frequencies of the received waveforms (e.g., $\delta f1$ and $\delta f2$). Thus, this beat frequency corresponds to time delays for the various objects, and wherein these time delays correspond to the ranges to the various objects, respectively. The beat frequency is much less than the carrier frequency, Fc; or the central frequency of the sweep. The beat frequency is then sampled by the ADC 320 to generate a digital radar signal 321.

In the baseband processor 304, a signal processing unit 323 includes FFT circuitry to perform a first FFT 322 and a second FFT 328. In some embodiments, the first FFT 322 and second FFT 328 correspond to separate FFT circuit instantiations arranged in series on an integrated circuit. In other embodiments, however, the first FFT 322 and second FFT 328 can be a single FFT circuit with surrounding circuitry to re-route data through the single FFT circuit multiple times to achieve the data processing illustrated in FIG. 3. In either case, the result is that a first fast Fourier transform (FFT)—or Range FFT 322—is initially performed on the digital radar signal 321. The Range FFT 322 separates the individual beat frequencies in the digital radar signal 321, which directly leads to a first FFT result 324 with a number of range bins, with each range bin corresponding to a different range of ranges/distances in which objects can be found. This FFT process is repeated over every ramp of n ramps (e.g., from ramp C0 . . . to ramp Cn), and the FFT results are stored in a first memory 326 for each of n ramps. When all the n ramps are complete, a block of data representing the full field range data is stored in the first memory 326. The results in each range bin (e.g., @E1 range bin 327, which includes a range value for Range E1 for each of the n ramps) may look similar for the various frequency ramps in that range bin, but, since the individual ramps C0, C1, . . . , Cn are separated in time, the samples in a given range bin carry a subtle phase difference induced by the Doppler shift of the various objects (e.g., a time delay due to a slight change in range for a object caused by the object moving by distance v*t, where v is the velocity of the object and t is time).

To recover Doppler information (e.g., velocity information about each object), a second FFT 328—or "Doppler FFT"—is performed on the co-located bins (represents the corner turn or transpose operation) from all ramps. The Doppler information is series of complex numbers, each representing the magnitude (amplitude) and phase of the received radar signal at a respective range-Doppler coordinate pair. The Doppler information is output as first bit stream on 331 and is stored in a memory 329. Note that in preferred embodiments the data is not simply a two-dimensional range-Doppler map but has a third dimension and may thus be thought of as a 3D radar cube having Range axis, Doppler axis, and a receive antennae axis (Nrx). Thus, the 3D radar cube stored in memory 329 includes received powers from various objects in a field, and can be plotted according to range bins, Doppler bins, and NRx receive antennas.

Conventional approaches process the complex numbers stored in the memory 329 only after the radar data cube is fully output into the memory by using software executing on a processor. However, aspects of the present disclosure lie in the appreciation that although such software is flexible, it runs more slowly than optimal, particularly for modern radar systems, such as in automotive radar systems. Moreover, it is necessary to store the complete radar data cube before processing can start.

To improve processing speed, the baseband processor 304 includes a first processing path 330 having a first processing path input and a first processing path output, as well as a second processing path 332 arranged in parallel with the first processing path 330. A first bus 331 couples the output of the second FFT 328 to the memory 329, and a second bus 337 couples the memory 329 to the Direct Memory Access (DMA) 335.

The second processing path 332 includes a detection circuit 336 having a detection circuit input coupled to the output of the FFT circuitry and having a detection circuit output coupled to the DMA 335. The detection circuit 336 includes an integration circuit 334 and an object detection circuit 338. Integration circuit 334 combines the data, for example, by averaging or summing a given Doppler and Range bin for a plurality of receive antennae. The object detection circuit 338, which may also be referred to as a comparator in some cases, compares the power levels output by this integration with a threshold value. The detection circuit 336 outputs a second stream of bits on bus 341 with a single bit corresponding to each range-Doppler coordinate and indicating whether the respective range-Doppler coordinate has a power level over the threshold value and hence which may be relevant for object detection. Bus 341 can be the same physical lines/wires as bus 337 or can be separate lines/wires.

The detection circuit 336 operates in conjunction with the DMA 335 to provide high-speed processing. For example, the detection circuit 336 can perform processing to determine whether the detected power levels at each range-Doppler coordinate pair in the memory 329 represent a potential object, and can write a logical "1" to memory buffer 340 when a potential object is detected at a given Range-Doppler coordinate pair, and can write a logical "0" to memory buffer 340 when no potential object is detected at the given Range-Doppler coordinate pair. For each "1" value, the DMA 335 then sets a DMA read configuration 342, wherein that DMA read configuration reads values for multiple range-Doppler coordinate pairs surrounding the range-Doppler coordinate pair where the "1" was detected. The DMA 335 thus sets the DMA read configuration 342 to extract from the memory 329 the corresponding complex numbers at and around the range-Doppler coordinates flagged by bits (e.g., "1"s) in the second bit stream on 341. In this way the necessary data for subsequent processing and object detection is extracted from the first bit stream on 331 and it is not necessary to completely store the complete radar data cube in memory 329 before starting to process the radar data. In general, by reducing software overhead, the DMA 335 and detection circuit 336 streamline processing and improve performance of the transceiver 300 compared to other approaches that utilize software for object detection.

Some aspects of the present disclosure lie in the appreciation that when targets are detected near the outer edges of the memory 329 (e.g., near a minimum Doppler or minimum Range value, and/or near a maximum Doppler or maximum range value), the DMA read configuration 342 can "overflow" or "underflow" the outer bounds of the memory 329. For instance, in the example DMA read configuration 342 illustrated in FIG. 3, a potential target is detected a base range-Doppler coordinate pair of 0,4 (which corresponds to a minimum range bin), and an offset of x=1 and y=1 is applied from this base range-Doppler coordinate pair to give the full DMA read configuration 342. As shown, this offset could potentially cause an underflow by which a portion of the read Range data would "roll-over" and "roll-around" an edge of the memory 329 to include data corresponding to the maximum Range bin (see 343). However, the data in the maximum range bin is not truly relevant to whether a target is present at the minimum range bin, and thus can be unhelpful or even harmful. Therefore, the present disclosure employs boundary checking techniques, which are implemented in hardware in the DMA 335, to help ensure only the most relevant data is included in the DMA read configuration. For example, in FIG. 3, the DMA 335 can read the actual data from the lower range bins 345, and replace the data from the maximum range bin 343 with predetermined values (e.g., "0" values), or another value that fairly reflects the actual data from the lower range bins (e.g., an average of the actual data from the lower range bins, the lowest actual data from the lower range bins, or other value).

Thus, the DMA 335 is configured to set the DMA read configuration (e.g., 342) based on a base range-Doppler coordinate pair (e.g., "*") in the range-Doppler map stored in memory 329. The DMA read configuration (e.g., 342) includes multiple range bins that are offset from the base range-Doppler coordinate pair by a Range offset (in FIG. 3's example, the Range offset is 1 above and 1 below the base range-Doppler coordinate pair). The DMA read configuration also includes multiple Doppler bins that are offset from the base range-Doppler coordinate pair by a Doppler offset (in FIG. 3's example, the Doppler offset is 1 above and 1 below the base range-Doppler coordinate pair). To avoid including "roll-over" data, the DMA 335 is configured to detect whether the range bin offset causes a range bin in the DMA read configuration to be greater than the maximum range bin or to be less than the minimum range bin; and is configured to detect whether the Doppler bin offset causes a Doppler bin in the DMA read configuration to be greater than the maximum Doppler bin or less than the minimum Doppler bin. In FIG. 3's example, the DMA detects that the range bin offset causes range bins (343) in the DMA read configuration 342 to be less than the minimum range bin, and therefore provides zero data or other data in place of the actual data for these range bins (343).

In some cases, all the blocks illustrated in the baseband processor 304 of FIG. 3 are included in a single integrated circuit. In other cases the blocks illustrated in the baseband processor 304 are spread among multiple integrated circuits arranged on a printed circuit board, or are disposed on multiple silicon substrates that are stacked in a single package as a 3-dimensional integrated circuit. For instance, the DMA 335 and detection circuit 336 can manifest as a circuit logic (e.g., transistors) arranged between the memory 329 and memory buffer 340. The transistors can include metal oxide semiconductor field effect transistors (MOSFETs), bi-polar junction transistors (BJTs), and/or fin field effect transistors (finFETs), and can be disposed in a silicon substrate. Moreover, the transistors can be connected to one another by copper metal lines and vias in a dielectric structure over the silicon substrate to achieve the functionality described.

Figure 4:
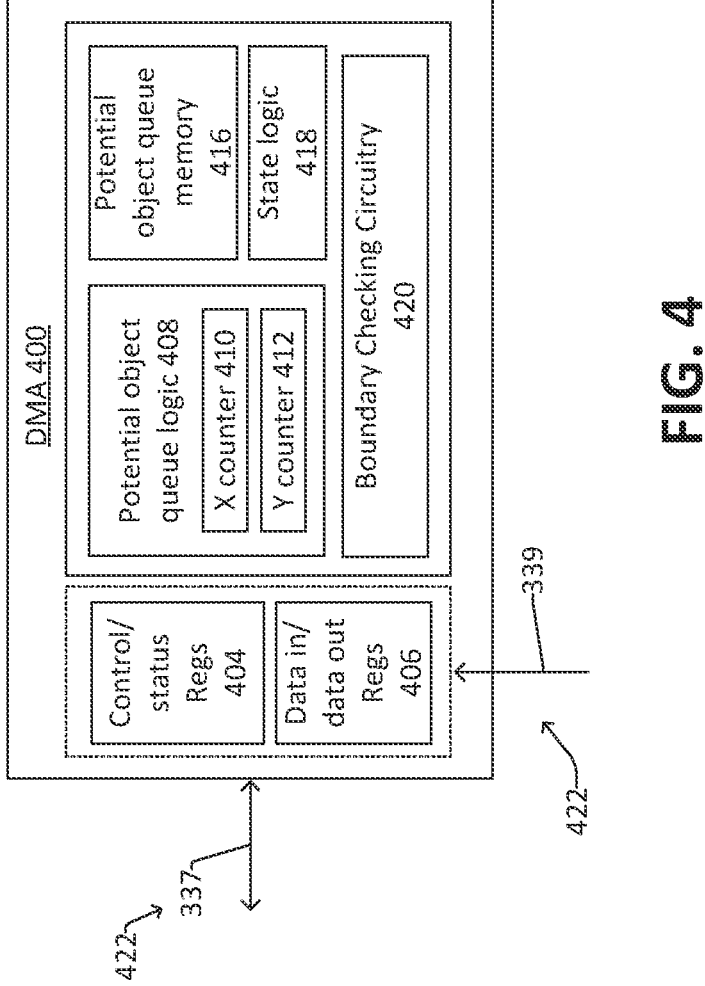
FIG. 4 illustrates a more detailed block diagram of a DMA.

FIG. 4 shows a more detailed block diagram of a DMA 400 in accordance with some aspects of the disclosure. The DMA 400 includes a memory bus interface 402 (e.g., which connects to bus structure 337 and/or 339 of FIG. 3), including a set of control/status registers 404 and data input/output registers 406. The memory bus interface 402 is coupled to potential object queue logic 408, which includes an X counter 410, and a Y counter 412. A potential object queue memory 416, state logic 418, and boundary checking circuitry 420 are also included in the DMA. The memory bus interface 402 can be coupled to memory 329 and to memory buffer 340 via a bus structure 422 (e.g., bus structure 337 and/or bus structure 339 of FIG. 3).

The bus structure 422 can employ serial data transfer or parallel data transfer, and is implemented as a series of wires on an integrated circuit, typically in a metal interconnect structure comprising metal (e.g., copper) lines stacked over one another and connected by metal (e.g., copper) vias which are disposed over a silicon substrate. For example, the bus structure 422 can typically include a read/write line, a group of address lines, and a group of data lines. In some cases, the data lines can include dedicated input data lines and dedicated output data lines that are separate/distinct from the input data lines, while in other cases the input and output lines can be bi-directional data lines used for transmission of both input data and output data.

FIGS. 5A-5J illustrate an example of how the radar data can be stored in memory 329 and evaluated in parallel by detection circuit 336. Generally, FIGS. 5A-5J illustrate memory 329 and detection circuit 336 as data is processed in time. The memory 329 and detection circuit 336 each store data in memory locations corresponding to range-Doppler coordinate pairs or range-Doppler bins. For the memory 329, the stored data corresponds to multiple Range bins, multiple Doppler bins, and multiple receive antennas (NRx) over time. For the detection circuit 336, the stored data corresponds to a single range bin, multiple Doppler bins, and multiple receive antennas (NRx) for a given time—with each bin represented by a box. For ease of understanding, a "*" symbol for a given range-Doppler coordinate pair in the first bit stream means that range-Doppler coordinate pair has a power intensity that is greater than a threshold value, such that a potential object is present in that range-Doppler coordinate pair. Other Range-Doppler coordinate pairs with power intensities that are less than the threshold value are left blank, meaning that no potential objects are present for those Range-Doppler coordinate pairs.

In FIG. 5A at a first time 502, memory 329 receives a first data vector (e.g., complex value of a first bit stream on 331 of FIG. 3) corresponding to a first range bin (R=0), and first Doppler bin (D=0), and multiple receive antennae (NRx) (see arrow 501). Concurrently, the detection circuit 336 has an integration circuit 334 that receives the first data vector, and performs integration on this first data vector over the multiple receive antennae (NRx) (see arrow 503). For example, the integration circuit 334 can sum the values of the first vector and/or calculate a weighted average for these values, thereby providing an integrated result (e.g., average power intensity). The object detection circuit 338 of the detection circuit 336 can then compare the integrated result to a predetermined threshold, and outputs a bit 505 to memory buffer 340, wherein the value of the bit 505 indicates the result of the comparison. For example, if the sum and/or weighted average is less than or equal to the predetermined threshold, then a "0" can be output; whereas if the sum and/or weighted average is greater than the predetermined threshold, then a "1" can be output. So at the first time 502, the integrated result is less than the threshold value (as evidenced by a 0 at the first bit 505 of memory buffer 340), so nothing is stored in the potential object queue memory 416 of the DMA at this time.

In FIG. 5B at a second time 504, a second data vector 507 is written to memory 329. Concurrently, the integration circuit 334 performs integration on this second data vector over the multiple receive antennae (NRx) (see arrow 508). The object detection circuit 338 of the detection circuit can then compare the second integration result to the predetermined threshold, and outputs a bit 509 whose value indicates the result of the comparison. Again, at the second time 504, the integrated result is less than the threshold value (as evidenced by a lack of a 1 in the second memory location of memory buffer 340), so nothing is stored in the potential object queue memory 416 at this time.

Additional data vectors are processed in FIGS. 5C-5D with integrations and comparisons being performed for each data vector, until the entire first Range bin has been processed, as shown for example in FIG. 5D. In FIG. 5C, for the range-Doppler coordinate pair of 0,2, the integration result is greater than the predetermined threshold, such that a "1" bit 511 thereby indicates a potential object is present for this range-Doppler coordinate pair. Thus, the DMA detects this potential object based on the "1" bit 511 in the second bit stream, and the X, Y values corresponding to this range-Doppler coordinate pair are stored in the potential object queue memory 416 of the DMA.

In FIG. 5E at time 510, the second range bin (X=1) is processed in the same way as the first range bin, with data being written to memory 329 and processed in parallel by detection circuit 336 as Doppler bins are incrementally increased from 0 to D. (Incrementation of the Y counter 412 in the second range bin for each location is not illustrated for simplicity.) In the second Range bin, no potential objects are detected, so no addresses are stored in the potential object queue memory 416.

In FIG. 5F at time 512, the third range bin (X=2) is processed in the same way. In the third range bin, the integration result for the D=5 Doppler bin is greater than the pre-determined threshold, such that a "1" bit 513 in the second bit stream indicates a potential object has been detected at an X, Y coordinate of 2,5. Therefore, this set of X, Y coordinates is also stored in the potential object queue memory 416 of DMA. Similarly, in FIG. 5H at time 514, another potential object is detected at a set of X, Y coordinates of 4,D, so this set of coordinates are also stored in the potential object queue memory 416. This process can continue until all Range-Doppler bins are processed, for instance as shown in FIG. 5J. In FIG. 5J, additional potential targets are detected at R,5 and R,D. Even after the entire 3D cube of radar data is processed, the data processing can continue (see arrow 516), such that the memory 329 and detection circuit 336 can continuously monitor and refresh the field for changes in distance (range) to objects in the field, as well for changes in velocity (Doppler) of those objects.

FIGS. 6A-6E follow from the example of FIGS. 5A-5J and illustrate how the DMA (e.g., 335 of FIG. 3 or 400 of FIG. 4) processes data from the memory 329 with boundary checking and based on information from the detection circuit 336. In this example, the DMA stores a series of base range-Doppler coordinate pairs in the potential object queue memory 416. Each base range-Doppler coordinate pair is identified by a first pair of indices (x,y), the Doppler bin offset is identified by a first integer (m), and the range bin offset is identified by a second integer (n). In the example of FIGS. 6A-6E, m and n are both equal to 1, but any other values for m and n can also be used and m and n can be equal to one another or different from one another. The DMA is configured to check whether x-n is less than the minimum Range bin and whether x+n is greater than the maximum Range bin. The DMA is also configured to check whether y−m is less than the minimum Doppler bin and whether y+m is greater than the maximum Doppler bin. Zero-padding or other values can then be applied for any overflow or under-flow values.

Figures 6A, 6B, 6C, 6D, 6E:
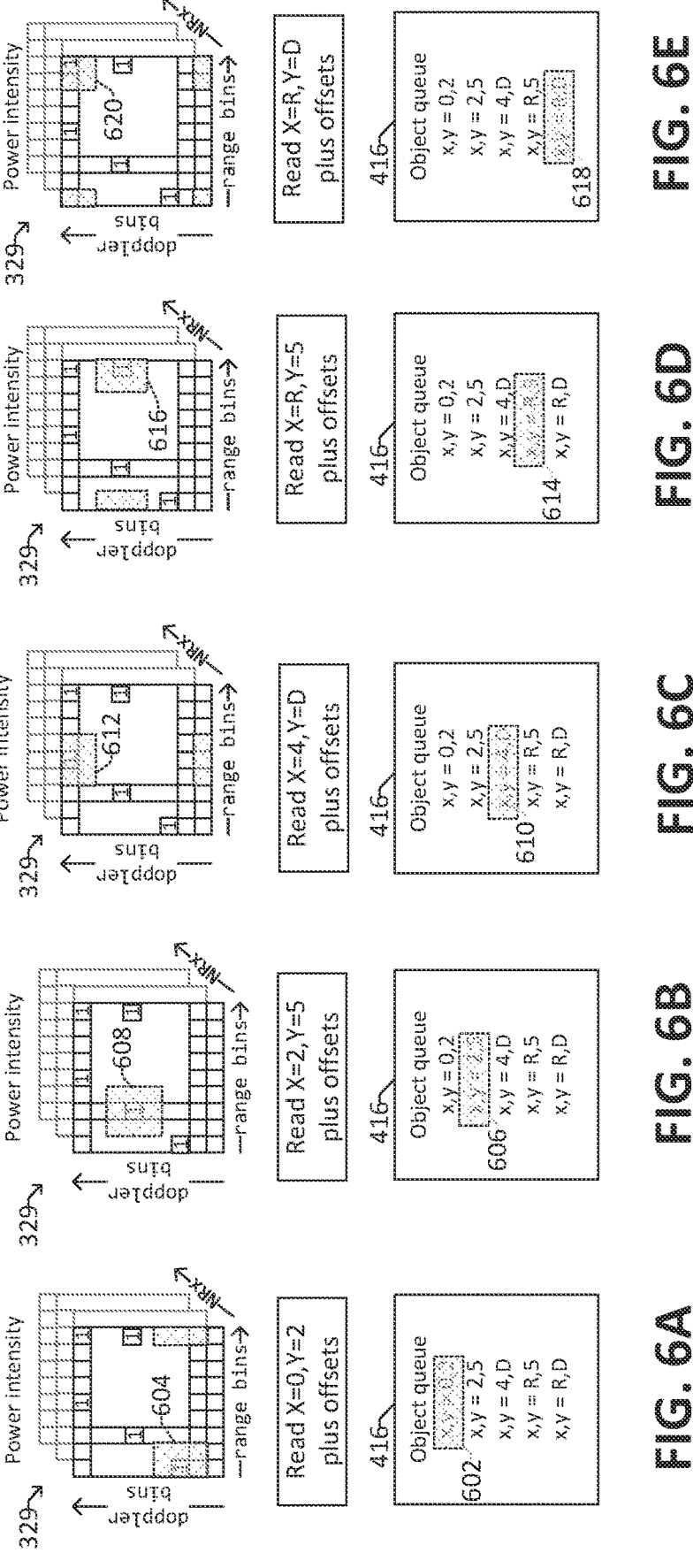
FIGS. 6A-6E illustrate DMA read configurations whereby the DMA makes use of hardware boundary checking

In FIG. 6A, the DMA starts with the first base range-Doppler coordinate pair 602 having X, Y coordinates of 0,2, which were determined by the detection circuit 336 and stored in the potential object queue memory 416 (see FIG. 5C). The DMA sets its DMA read configuration 604 by starting with the first base range-Doppler coordinate pair, and including an offset for the DMA configuration. Here, for example, the first base range-Doppler coordinate pair 602 is 0,2, and the m and n offsets are 1, so the DMA read configuration corresponds to a first 2D square/polygon that is three Doppler bins high and three Range bins wide (and/or can read a 3D square prism, 3D rectangular prism, etc.; e.g., a 3D square prism can include offsets of m=1, n=1, and all Z coordinates). In other examples, other offsets can also be used and/or other lengths/widths for the first square/polygon 604 can be used, and FIG. 6A is merely a non-limiting example for purposes of illustration/explanation.

Because X−m (e.g., 0−1=−1) is less than the minimum range value (e.g., 0), the boundary checking logic in the DMA determines a Range underflow condition is present. Accordingly, for the Range bins that have "rolled over" the left edge of the memory 329, the DMA disregards the data values present for these Range bins and inserts other values. For example, the DMA can insert zero values or can insert an average value indicative of the valid range bins.

Further, the value to be used in the overflow bins can be selected to cause minimum disturbance/error in any algorithms used for post-processing the extracted data. For example, using zeros for the overflow bins can be appropriate for post-processing to establish "Direction of Arrival" of an extracted target.

Similarly, in FIG. 6B, the same process is carried out for a second potential object at a second set of X, Y coordinates 606 (X,Y=2,5) (see also FIG. 5F). In FIG. 6B, the second DMA read configuration does not cause any boundary checking issues, so all values for the entire DMA read configuration 608 are included in the DMA read operation.

In FIG. 6C, the DMA starts with the third base range-Doppler coordinate pair 610 having X,Y coordinates of 4,D, which were determined by the detection circuit 336 and stored in the potential object queue memory 416 (see FIG. 5H). The DMA sets its DMA read configuration 612 by starting with the third base range-Doppler coordinate pair, and re-applying the offsets of m, n (e.g., m=n=1). In this case, Y+n (e.g., D+1) is greater than the maximum Doppler bin value (e.g., D), such that the boundary checking logic in the DMA determines a Doppler overflow condition is present. Accordingly, for the Doppler bins that have "rolled over" the upper edge of the memory 329, the DMA disregards the data values present for these Doppler bins and inserts other values. For example, the DMA can insert zero values or can insert an average value indicative of the valid Doppler bins.

FIG. 6D illustrates a Range bin overflow, in which the DMA read configuration includes Range bins that are greater than a maximum range bin. Thus data in these "overflow" bins that rolled over the right edge of the memory 329 will be disregarded and/or replaced to help provide more accurate target detection.

FIG. 6E illustrates a case of a single DMA read configuration triggering simultaneous Range overflow and Doppler overflow, in which the DMA read configuration includes Range bins that are greater than a maximum range bin and Doppler bins that are greater than a maximum Doppler bin. So here, data of the Range overflow bins and Doppler overflow bins could also be disregarded and/or replaced to help provide more accurate target detection.

An alternative technique uses only the base address of the generated DMA transaction and parameters defining the size of the memory 329. In this technique, the base address is divided by the largest address offset. This generates the co-ordinate index for the axis associated with the largest address offset. For some radar memories, this would be the range (x) axis. The remainder of the first division is divided by the next largest address offset. This generates the coordinate index for the axis associated with the next largest address offset. For some radar memories, this would be the antenna axis. Note that because identified objects are present in all antenna, a configuration generated from an SPU detected object would be expected to read all antenna so the initial antenna index would be 0 in all cases. The remainder of the second division is divided by the final (smallest) address offset. This generates the co-ordinate index for the third axis. For some radar memories, this would be the Doppler (y) axis. Note that under this technique, the DMA is configured based on a mapping of the co-ordinate axes of the memory to the DMA's own internal address generators. Once the co-ordinate indices have been derived, the implementation proceeds in the same manner as the technique illustrated in FIGS. 6A-6E with the modification that the derived co-ordinates indicate the start of the fetch operation rather than the exact location of the object in the center of the fetched region. If X+(n*2) is less than the maximum range bin, then the generated DMA configuration will overflow on the range axis. If y+(m*2) is less than the maximum Doppler bin, then the generated DMA configuration will overflow on the Doppler axis.

Some examples relate to a baseband processor for radar. The baseband processor includes a fast Fourier transform (FFT) circuit configured to output a first stream of complex numbers representing magnitude and phase at respective range-Doppler coordinate pairs. A memory is coupled to the FFT circuit and configured to store the first stream of complex numbers as a range-Doppler map. The range-Doppler map includes a series of range bins extending from a minimum range bin to a maximum range bin and includes a series of Doppler bins extending from a minimum Doppler bin to a maximum Doppler bin. A Direct Memory Access (DMA) is coupled to memory. The DMA is configured to set a DMA read configuration based on a base range-Doppler coordinate pair in the range-Doppler map. The DMA read configuration includes multiple range bins offset from the base range-Doppler coordinate pair by a Range offset and includes multiple Doppler bins offset from the base range-Doppler coordinate pair by a Doppler offset. The DMA is configured to detect whether the range bin offset causes a range bin in the DMA read configuration to be greater than the maximum range bin or less than the minimum range bin. The DMA is also configured to detect whether the Doppler bin offset causes a Doppler bin in the DMA read configuration to be greater than the maximum Doppler bin or less than the minimum Doppler bin.

In some examples of the baseband processor, the DMA is further configured to replace data of the range bin in the DMA read configuration which is greater than the maximum range bin or less than the minimum range bin with data that differs from the data of the range bin.

In some examples of the baseband processor, the DMA is further configured to replace data of the Doppler bin which is greater than the maximum Doppler bin or less than the minimum Doppler bin with data that differs from the data of the Doppler bin.

In some examples of the baseband processor, the data has a predetermined value of zero.

In some examples of the baseband processor, the base range-Doppler coordinate pair is identified by a first pair of indices (x,y), the Doppler bin offset is identified by a first integer (m), and the range bin offset is identified by a second integer (n).

In some examples of the baseband processor, the DMA is configured to check whether x−n is less than the minimum Range bin and whether x+n is greater than the maximum Range bin.

In some examples of the baseband processor, the DMA is configured to check whether y−m is less than the minimum Doppler bin and whether y+m is greater than the maximum Doppler bin.

In some examples of the baseband processor, the DMA includes: a memory bus interface including control/status registers and data-in/data-out registers coupled to the memory; a potential object queue logic coupled to the memory bus interface; a potential object queue memory coupled to the potential object queue logic; and boundary checking circuitry. The boundary checking circuitry is configured to detect whether the range bin offset causes a range bin in the DMA read configuration to be greater than the maximum range bin or less than the minimum range bin; and to detect whether the Doppler bin offset causes a Doppler bin in the DMA read configuration to be greater than the maximum Doppler bin or less than the minimum Doppler bin.

Some further examples relate to a baseband processor. The baseband processor includes a fast Fourier transform (FFT) circuit configured to output a first stream of complex numbers representing magnitude and phase at respective range-Doppler coordinate pairs. a memory coupled to the FFT circuit and configured to store the first stream of complex numbers as a range-Doppler map. The range-Doppler map includes a series of range bins extending from a minimum range bin to a maximum range bin and includes a series of Doppler bins extending from a minimum Doppler bin to a maximum Doppler bin. A detection circuit is coupled to the FFT circuit and is configured to output a second stream of bits based on the first stream of complex numbers. Individual bits in the second stream of bits indicate whether a value corresponding to each respective range-Doppler coordinate pair exceeds a threshold value. A Direct Memory Access (DMA) is coupled to the memory and coupled to the detection circuit. The DMA is configured to generate a DMA read configuration for an individual bit in the second stream of bits which indicates that the value exceeds the threshold value. The DMA is further configured, for each DMA read configuration, to read a plurality of complex numbers from the memory at a plurality of range-Doppler coordinate pairs. The DMA is further configured to detect when the DMA read configuration includes a range bin value that is greater than the maximum range bin or less than the minimum range bin; and is configured to detect when the DMA read configuration includes a Doppler bin value that is greater than the maximum Doppler bin or less than the minimum Doppler bin.

In some examples of the baseband processor, the DMA is further configured to, in place of data stored at a range-Doppler coordinate pair of the range bin which is greater than the maximum range bin or less than the minimum range bin, process different data from what is stored in the memory at the range-Doppler coordinate pair.

In some examples of the baseband processor, the DMA is further configured to, in place of data stored at a range-Doppler coordinate pair of the Doppler bin which is greater than the maximum Doppler bin or less than the minimum Doppler bin, process different data from what is stored in the memory at the range-Doppler coordinate pair.

In some examples of the baseband processor, the detection circuit is configured to evaluate the value in parallel with the memory storing the first stream of complex numbers.

In some examples of the baseband processor, the plurality of complex numbers read from the memory by the DMA corresponds to values arranged in a square, a square prism, a rectangle, a rectangular prism, or a polygon, which surrounds the range-Doppler coordinate pair.

In some examples of the baseband processor, the detection circuit includes an integration circuit configured to process a data vector corresponding to a range-Doppler coordinate pair and thereby provide an integration result, and also includes an object detection circuit configured to compare the integration result to the threshold value, and to generate a bit in the second stream of bits based on the comparison.

In some examples of the baseband processor, the DMA includes a bus interface including control/status registers and data-in/data-out registers; a potential object queue logic coupled to the bus interface; a potential object queue memory coupled to the potential object queue logic; and boundary checking circuitry. The boundary checking circuitry is configured to detect whether the range bin offset causes a range bin in the DMA read configuration to be greater than the maximum range bin or less than the minimum range bin; and to detect whether the Doppler bin offset causes a Doppler bin in the DMA read configuration to be greater than the maximum Doppler bin or less than the minimum Doppler bin.

Still further examples relate to a radar system. The radar system includes a direct memory access (DMA). The DMA includes: a bus interface including control/status registers and data-in/data-out registers; a potential object queue memory coupled to the bus interface; a potential object queue logic coupled to the potential object queue memory; and boundary checking circuitry. The boundary checking circuitry is configured to detect whether any portion of a DMA read configuration is greater than a maximum range bin or less than a minimum range bin; and to detect whether any portion of the DMA read configuration is greater than a maximum Doppler bin or less than a minimum Doppler bin.

In some examples of the radar system, the potential object queue memory is configured to receive a base range-Doppler coordinate pair. The potential object queue logic is configured to set the DMA read configuration based on the base range-Doppler coordinate pair.

In some examples of the radar system, the potential object queue logic is configured to set the DMA read configuration to include multiple range-Doppler coordinate pairs from which the DMA reads data. The potential object queue logic is configured to set the DMA read configuration based on the base range-Doppler coordinate pair, the range bin offset, and the Doppler bin offset.

In some examples of the radar system, the radar system further includes a radio frequency (RF) front end to provide radar data. The RF front end includes a plurality of radar receive antennae and an analog-to-digital converter. A signal processing unit is coupled the analog-to-digital converter. The signal processing unit is configured to perform a fast Fourier transform (FFT) on the radar data to provide a first bit stream. A memory is coupled to the signal processing unit and is configured to store the first bit stream. Data in the memory includes a series of range bins extending from the minimum range bin to the maximum range bin and includes a series of Doppler bins extending from the minimum Doppler bin to the maximum Doppler bin.

In some examples of the radar system, the radar system further includes a detection circuit configured to output a second stream of bits based on the first bit stream, where respective individual bits in the second stream of bits indicate whether respective values corresponding to respective range-Doppler coordinate pairs in the first bit stream exceed a threshold value. The DMA read configuration is set based on the second stream of bits.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. A baseband processor for radar, comprising a fast Fourier transform (FFT) circuit configured to output a first stream of complex numbers representing magnitude and phase at respective range-Doppler coordinate pairs;

a memory coupled to the FFT circuit and configured to store the first stream of complex numbers as a range-Doppler map, wherein the range-Doppler map includes a series of range bins extending from a minimum range bin to a maximum range bin and includes a series of Doppler bins extending from a minimum Doppler bin to a maximum Doppler bin; and a Direct Memory Access (DMA) coupled to memory, the DMA configured to set a DMA read configuration based on a base range-Doppler coordinate pair in the range-Doppler map, the DMA read configuration including multiple range bins offset from the base range-Doppler coordinate pair by a range bin offset and including multiple Doppler bins offset from the base range-Doppler coordinate pair by a Doppler bin offset, wherein the DMA is configured to detect whether the range bin offset causes a range bin in the DMA read configuration to be greater than the maximum range bin or less than the minimum range bin; and to detect whether the Doppler bin offset causes a Doppler bin in the DMA read configuration to be greater than the maximum Doppler bin or less than the minimum Doppler bin.

2. The baseband processor of claim 1, wherein the DMA is further configured to replace data of the range bin in the DMA read configuration which is greater than the maximum range bin or less than the minimum range bin with data that differs from the data of the range bin.

3. The baseband processor of claim 1, wherein the DMA is further configured to replace data of the Doppler bin which is greater than the maximum Doppler bin or less than the minimum Doppler bin with data that differs from the data of the Doppler bin.

4. The baseband processor of claim 3, wherein the data has a predetermined value of zero.

5. The baseband processor of claim 1, wherein the base range-Doppler coordinate pair is identified by a first pair of indices (x,y), the Doppler bin offset is identified by a first integer (m), and the range bin offset is identified by a second integer (n).

6. The baseband processor of claim 5, wherein the DMA is configured to check whether x−n is less than the minimum range bin and whether x+n is greater than the maximum range bin.

7. The baseband processor of claim 5, wherein the DMA is configured to check whether y−m is less than the minimum Doppler bin and whether y+m is greater than the maximum Doppler bin.

8. The baseband processor of claim 1, wherein the DMA comprises:

a memory bus interface including control/status registers and data-in/data-out registers coupled to the memory;

a potential object queue logic coupled to the memory bus interface;

a potential object queue memory coupled to the potential object queue logic; and boundary checking circuitry configured to detect whether the range bin offset causes a range bin in the DMA read configuration to be greater than the maximum range bin or less than the minimum range bin; and to detect whether the Doppler bin offset causes a Doppler bin in the DMA read configuration to be greater than the maximum Doppler bin or less than the minimum Doppler bin.

9. A baseband processor for radar, comprising a fast Fourier transform (FFT) circuit configured to output a first stream of complex numbers representing magnitude and phase at respective range-Doppler coordinate pairs;

a memory coupled to the FFT circuit and configured to store the first stream of complex numbers as a range-Doppler map, wherein the range-Doppler map includes a series of range bins extending from a minimum range bin to a maximum range bin and includes a series of Doppler bins extending from a minimum Doppler bin to a maximum Doppler bin;

a detection circuit coupled to the FFT circuit and configured to output a second stream of bits based on the first stream of complex numbers, wherein individual bits in the second stream of bits indicate whether a value corresponding to each respective range-Doppler coordinate pair exceeds a threshold value; and a Direct Memory Access (DMA) coupled to the memory and coupled to the detection circuit, the DMA configured to generate a DMA read configuration for an individual bit in the second stream of bits which indicates that the value exceeds the threshold value, and the DMA further configured, for each DMA read configuration, to read a plurality of complex numbers from the memory at a plurality of range-Doppler coordinate pairs;

wherein the DMA comprises:

a bus interface including control/status registers and data-in/data-out registers;

a potential object queue logic coupled to the bus interface;

a potential object queue memory coupled to the potential object queue logic; and boundary checking circuitry configured to detect whether a range bin offset causes a range bin in the DMA read configuration to be greater than the maximum range bin or less than the minimum range bin; and to detect whether a Doppler bin offset causes a Doppler bin in the DMA read configuration to be greater than the maximum Doppler bin or less than the minimum Doppler bin.

10. The baseband processor of claim 9, wherein the DMA is further configured to, in place of data stored at a range-Doppler coordinate pair of the range bin which is greater than the maximum range bin or less than the minimum range bin, process different data from what is stored in the memory at the range-Doppler coordinate pair.

11. The baseband processor of claim 9, wherein the DMA is further configured to, in place of data stored at a range-Doppler coordinate pair of the Doppler bin which is greater than the maximum Doppler bin or less than the minimum Doppler bin, process different data from what is stored in the memory at the range-Doppler coordinate pair.

12. The baseband processor of claim 9, wherein the detection circuit is configured to evaluate the value in parallel with the memory storing the first stream of complex numbers.

13. The baseband processor of claim 9, wherein the plurality of complex numbers read from the memory by the DMA corresponds to values arranged in a square, a square prism, a rectangle, a rectangular prism, or a polygon, which surrounds the range-Doppler coordinate pair.

14. The baseband processor of claim 9, wherein the detection circuit comprises:

an integration circuit configured to process a data vector corresponding to a range-Doppler coordinate pair and thereby provide an integration result; and an object detection circuit configured to compare the integration result to the threshold value, and to generate a bit in the second stream of bits based on the comparison.

15. A radar system, comprising a direct memory access (DMA), the DMA comprising:

a bus interface including control/status registers and data-in/data-out registers;

a potential object queue memory coupled to the bus interface;

a potential object queue logic coupled to the potential object queue memory; and boundary checking circuitry configured to detect whether any portion of a DMA read configuration is greater than a maximum range bin or less than a minimum range bin; and to detect whether any portion of the DMA read configuration is greater than a maximum Doppler bin or less than a minimum Doppler bin; and wherein the potential object queue logic is configured to set the DMA read configuration to include multiple range-Doppler coordinate pairs from which the DMA reads data, wherein the potential object queue logic is configured to set the DMA read configuration based on a base range-Doppler coordinate pair, a range bin offset, and a Doppler bin offset.

16. The radar system of claim 15, further comprising:

a radio frequency (RF) front end to provide radar data, the RF front end including a plurality of radar receive antennae and an analog-to-digital converter;

a signal processing unit coupled to the analog-to-digital converter, the signal processing unit configured to perform a fast Fourier transform (FFT) on the radar data to provide a first bit stream;

a memory coupled to the signal processing unit and configured to store the first bit stream, wherein data in the memory includes a series of range bins extending from the minimum range bin to the maximum range bin and includes a series of Doppler bins extending from the minimum Doppler bin to the maximum Doppler bin.

17. The radar system of claim 16, further comprising:

a detection circuit configured to output a second stream of bits based on the first bit stream, where respective individual bits in the second stream of bits indicate whether respective values corresponding to respective range-Doppler coordinate pairs in the first bit stream exceed a threshold value;

wherein the DMA read configuration is set based on the second stream of bits.

* * * * *